L. H. VOLD.
CLAMPING MECHANISM.
APPLICATION FILED NOV. 28, 1910.
991,675.
Patented May 9, 1911.
2 SHEETS—SHEET 1.
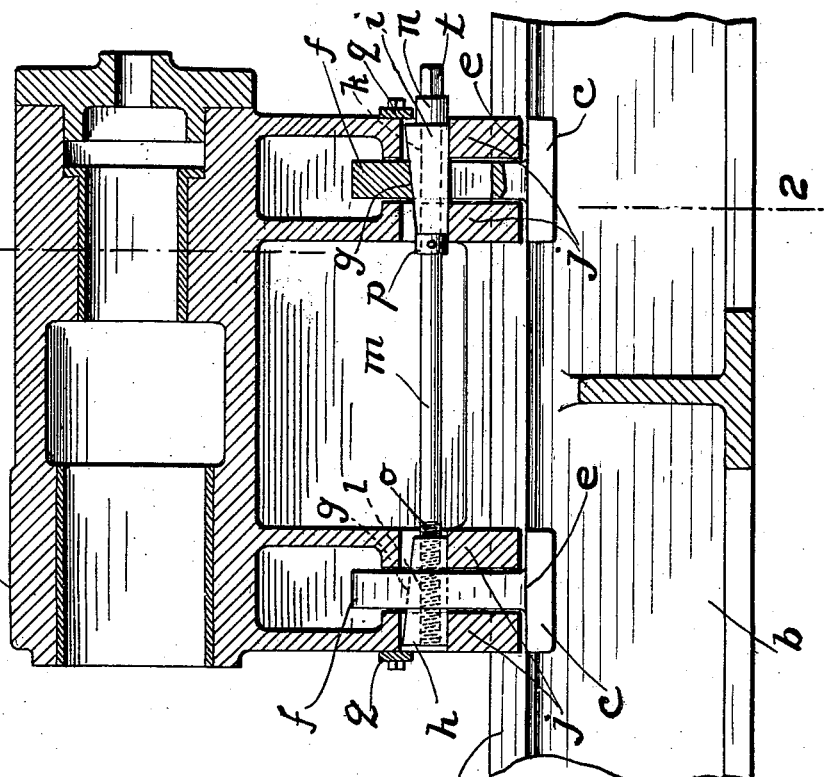
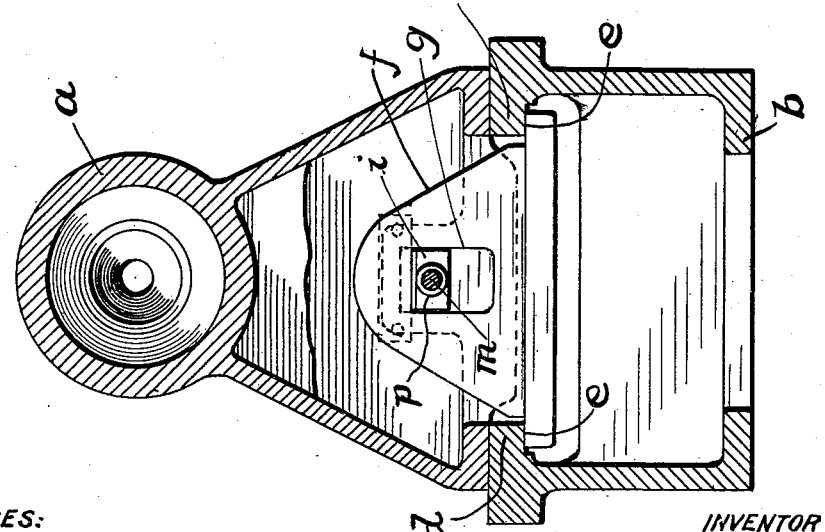
WITNESSES:
INVENTOR
BY
ATTORNEYS.

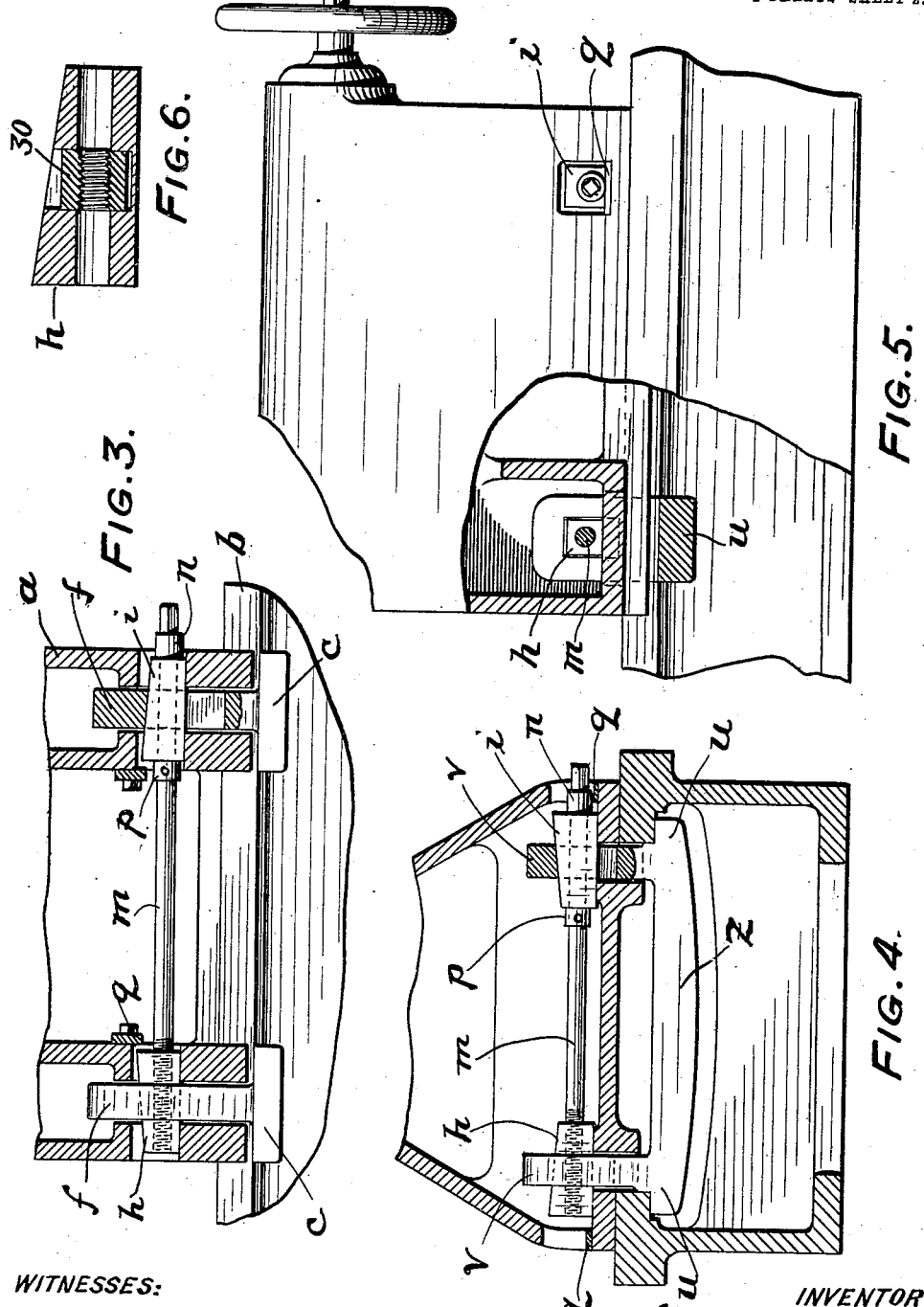

UNITED STATES PATENT OFFICE.

LARS H. VOLD, OF WESTVILLE, NEW JERSEY, ASSIGNOR TO WILLIAM SELLERS & COMPANY, INCORPORATED, OF PHILADELPHIA, PENNSYLVANIA, A CORPORATION OF PENNSYLVANIA.

CLAMPING MECHANISM.

991,675. Specification of Letters Patent. Patented May 9, 1911.

Application filed November 28, 1910. Serial No. 594,461.

*To all whom it may concern:*

Be it known that I, LARS H. VOLD, a citizen of the United States, residing at Westville, county of Gloucester, and State of New Jersey, have invented a new and useful Improvement in Clamping Mechanism, of which the following is a full, clear, and exact description, reference being had to the accompanying drawings, which form a part of this specification.

The object of my invention is to provide a means for thoroughly clamping a piece of mechanism, such as the puppet head or tail stock of a lathe, to the bed on which it slides.

It is commonly the practice in large lathe heads to use a number of clamping bolts, which require time to set up, and usually it is necessary for the operator to pass to the opposite side of the head to adjust some of the bolts.

My invention comprises clamping mechanisms which may be simultaneously operated from one point. The clamping mechanism may be arranged, for instance, at the ends of the head of the lathe, and operated from the front or back surface, or it may be arranged to operate from the side of the head, as most convenient in any special case.

I will now described the embodiment of my invention applied to a lathe, disclosed in the accompanying drawings, and then specifically point out the invention in the claims.

In the drawings: Figure 1 shows a section through an ordinary lathe tail stock. Fig. 2 is a cross section on the line 2—2 Fig. 1. Fig. 3 is a partial sectional view showing another arrangement of wedges. Fig. 4 is a partial cross section showing another form of clamping mechanism. Fig. 5 is an elevational view partially broken away, of the form shown in Fig. 4. Fig. 6 is a detail view showing another construction of threaded portion in the wedge.

Referring to Figs. 1 and 2, $a$ is the head, $b$ the bed on which it slides. $c$ are clamping members which bear on the overhanging edges $d$ of the bed $b$, so that when lifted they will pinch the bed on both sides between the clamping surface $e$ and the bottom of the head. Each clamping member has an extension $f$, which may be integral with the clamp or secured thereto, each extension is provided with an opening $g$, in one opening a wedge $h$ and in the other opening a wedge $i$. As shown, the lower surfaces of the wedges bear on portions $j$ of the head $a$, and their upper or inclined surfaces support the clamps $c$ by the extensions $f$. One of these wedges $i$ is provided with a straight hole $k$, and the other wedge $h$ has a threaded hole $l$, which thread may be formed in the wall of the orifice or by means of an inserted or attached nut 30 (see Fig. 6). $m$ is a shaft, which passes through the wedge $i$, and has a threaded end $o$ which engages a corresponding thread in the wedge $h$. The shaft $m$ has an enlarged portion $n$, which abuts against the outer surface of wedge $i$. A collar $p$ on the shaft $m$ acts with the enlargement $n$, to compel the wedge $i$ to move as the shaft $m$ moves endwise in either direction. $q$, $q$ are stops to limit the outward movement of the wedges. When the shaft $m$ is rotated in one direction, the threaded end of the shaft works in the threaded orifice of the wedge $h$, drawing the two wedges toward each other through the medium of the enlargement $n$ on the shaft $m$. This continues until one or the other wedge surfaces becomes active with respect to the surface of the extension $f$, when that wedge will cease to advance and will form an abutment against which the screw will act to draw the other wedge into action with respect to its extension $f$. This continues until the resistance of the wedges is the same, after which they will move together as far as possible, lifting the extensions $f$ and clamping the clamping members against the overhanging extension of the bed. In this way the clamping members will be drawn up with practically equal pressure on each. To release the clamping members, the shaft $m$ is rotated in the opposite direction to unscrew the threaded portion from the wedge $h$, and so force the wedges apart, the collar $p$ serving to move the wedge $i$. If one of the wedges starts more easily than the other, it may advance alone until it strikes the stop $q$. It will then cease to move and will form an abutment against which the screw will act to force the other wedge outward and thus release its clamp.

If desired, the wedges may be arranged in a reverse direction, so that they will move apart to clamp and together to release, as shown in Fig. 3. The principle of action and the parts themselves are exactly the same as shown in Fig. 1.

In the device illustrated in Figs. 1 and 2, the clamping shaft *m* is placed in the direction of the length of the lathe bed and is operated from the rear end of the head by the square *t* on the end of the shaft *m*. This may be accessible from either side of the bed.

If it be desired to operate the clamp from the front or the back of the lathe, the device may be modified as shown in Figs. 4 and 5. In this construction, the two clamping members *u* are connected together. Each clamping member is provided with an extension *v* corresponding in construction to the extensions *f* of Figs. 1 and 2, and with respect to each set of extensions, the wedges *h* and *i*, similar to wedges *h* and *i* of the previous construction, are employed, as is also a shaft *m*, enlargement *n*, collar *p* and stops *q*. In this case each set of clamping members must be separately operated. In practice I can use one or a plurality of such sets of clamping members. In this case, to clamp or unclamp, if a plurality of sets of clamping members be used, it requires a separate action on the two or more shafts similar to the action on the single shaft of the previous construction. This construction enables the clamping members to be tightened from the side (front or back) of the lathe instead of from the end.

Having now fully described my invention, what I claim and desire to protect by Letters Patent is:

1. The combination with a bed having overhanging edges of a plurality of clamping members having clamping surfaces adapted to the overhanging edges of the bed, an extension from each clamping member, there being orifices in said extensions, a wedge in each orifice, one of said wedges having a plain orifice therethrough, the other an orifice provided with a thread therein, and a shaft passing through said plain orifice and having a threaded portion working in the thread in the other orifice.

2. The combination with a bed having overhanging edges of a plurality of clamping members having clamping surfaces adapted to the overhanging edges of the bed, an extension from each clamping member, there being orifices in said extensions, a wedge in each orifice, one of said wedges having a plain orifice therethrough, the other an orifice provided with a thread therein, a shaft passing through said plain orifice and having a threaded portion working in the thread in the other orifice, and projections on the shaft on opposite ends of the plain orifice.

3. The combination with a bed having overhanging edges of a plurality of clamping members having clamping surfaces adapted to the overhanging edges of the bed, an extension from each clamping member, there being orifices in said extensions, a wedge in each orifice, the inclined surface of said wedge supporting the clamp, a fixed impediment against which the other surface acts, one of said wedges having a plain orifice therethrough, the other an orifice provided with a thread therein, and a shaft passing through said plain orifice and having a threaded portion working in the thread in the other orifice.

4. The combination with a bed having overhanging edges of a plurality of clamping members having clamping surfaces adapted to the overhanging edges of the bed, an extension from each clamping member, there being orifices in said extensions, a wedge in each orifice, the inclined surface of said wedge supporting the clamp, a fixed impediment against which the other surface acts, one of said wedges having a plain orifice therethrough, the other an orifice provided with a thread therein, a shaft passing through said plain orifice and having a threaded portion working in the thread in the other orifice, and projections on the shaft on opposite ends of the plain orifice.

5. In combination, a plurality of clamping surfaces, extensions from each clamping member, said extensions having orifices, wedges in said orifices, one surface of each wedge supporting the clamp and a fixed impediment for each wedge against which the other surface coacts, one surface of each wedge supporting its corresponding clamping member, a fixed abutment on which the other surface of each wedge rests, one of said wedges having a plain opening therethrough, the other a threaded orifice therein, a shaft passing through the plain orifice wedge and having a threaded portion working in the thread in the orifice of the other wedge, and stops on said shaft on opposite ends of the plain orificed wedge.

6. The combination with a bed having overhanging edges of a plurality of clamping members having clamping surfaces, adapted to the overhanging edges of the bed, an extension from each clamping member, there being orifices in said extensions, a wedge in each orifice, one of said wedges having a plain orifice therethrough, the other an orifice provided with a thread therein, and a shaft passing through said plain orifice and having a threaded portion working in the thread in the other orifice, and stops limiting the movement of the wedges to release.

7. The combination with a bed having overhanging edges of a plurality of clamping members having clamping surfaces adapted to the overhanging edges of the bed, an extension from each clamping member, there being orifices in said extensions, a wedge in each orifice, one of said wedges having a plain orifice therethrough, the other an orifice provided with a thread therein, a shaft passing through said plain orifice and having a threaded portion working in the thread in the other orifice, and projections on the shaft on opposite ends of the plain orifice, and stops limiting the movement of the wedges to release.

8. In combination, a plurality of clamping surfaces, extensions from each clamping member, said extensions having orifices, wedges in said orifices, one surface of each wedge supporting its corresponding clamping member, a fixed abutment on which the other surface of each wedge rests, one of said wedges having a plain opening therethrough, the other a threaded orifice therein, a shaft passing through the plain orifice wedge and having a threaded portion working in the thread in the other orifice of the other wedge, and stops on said shaft on opposite ends of the plain orificed wedge, and stops limiting the movement of the wedges to release.

9. The combination with a bed having overhanging edges of a plurality of clamping members having clamping surfaces adapted to the overhanging edges of the bed, an extension from each clamping member, there being orifices in said extensions, a wedge in each orifice, the inclined surface of said wedge supporting the clamp, a fixed impediment against which the other surface acts, one of said wedges having a plain orifice therethrough, the other an orifice provided with a thread therein, a shaft passing through said plain orifice and having a threaded portion working in the thread in the other orifice, and stops limiting the movement of the wedges to release.

10. The combination with a bed having overhanging edges of a plurality of clamping members having clamping surfaces adapted to the overhanging edges of the bed, an extension from each clamping member, there being orifices in said extensions, a wedge in each orifice, the inclined surface of said wedge supporting the clamp, a fixed impediment against which the other surface acts, one of said wedges having a plain orifice therethrough, the other an orifice provided with a thread therein, a shaft passing through said plain orifice and having a threaded portion working in the thread in the other orifice, projections on the shaft on opposite ends of the plain orifice, and stops limiting the movement of the wedges to release.

11. In combination, a plurality of clamping surfaces, extensions from each clamping member, said extensions having orifices, wedges in said orifices, one surface of each wedge supporting the clamp and a fixed impediment for each wedge against which the other surface coacts, one surface of each wedge supporting its corresponding clamping member, a fixed abutment on which the other surface of each wedge rests, one of said wedges having a plain opening therethrough, the other a threaded orifice therein, a shaft passing through the plain orifice wedge and having a threaded portion working in the thread in the orifice of the other wedge, stops on said shaft on opposite ends of the plain orificed wedge, and stops limiting the movement of the wedges to release.

12. The combination with a bed having overhanging edges of a plurality of clamping members having clamping surfaces adapted to the overhanging edges of the bed, an extension from each clamping member, there being orifices in said extensions, a wedge in each orifice, one of said wedges having a plain orifice therethrough, the other an orifice provided with a thread therein, a shaft passing through said plain orifice and having a threaded portion working in the thread in the other orifice, and means to limit the movement of the wedges to release.

13. The combination with a bed having overhanging edges of a plurality of clamping members having clamping surfaces adapted to the overhanging edges of the bed, an extension from each clamping member, there being orifices in said extensions, a wedge in each orifice, one of said wedges having a plain orifice therethrough, the other an orifice provided with a thread therein, a shaft passing through said plain orifice and having a threaded portion working in the thread in the other orifice, projections on the shaft on opposite ends of the plain orifice, and means to limit the movement of the wedges to release.

14. In combination, a plurality of clamping surfaces, extensions from each clamping member, said extensions having orifices, wedges in said orifices, one surface of each wedge supporting its corresponding clamping member, a fixed abutment on which the other surface of each wedge rests, one of said wedges having a plain opening therethrough, the other a threaded orifice therein, a shaft passing through the plain orifice wedge and having a threaded portion working in the thread in the other orifice of the other wedge, stops on said shaft on opposite ends of the plain orificed wedge, and means to limit the movement of the wedges to release.

15. The combination with a bed having overhanging edges of a plurality of clamping members having clamping surfaces adapted to the overhanging edges of the bed, an extension from each clamping member, there being orifices in said extensions, a wedge in each orifice, the inclined surface of said wedge supporting the clamp, a fixed impediment against which the other surface acts, one of said wedges having a plain orifice therethrough, the other an orifice provided with a thread therein, a shaft passing through said plain orifice and having a threaded portion working in the thread in the other orifice, and means to limit the movement of the wedges to release.

16. The combination with a bed having overhanging edges of a plurality of clamping members having clamping surfaces adapted to the overhanging edges of the bed, an extension from each clamping member, there being orifices in said extensions, a wedge in each orifice, the inclined surface of said wedge supporting the clamp, a fixed impediment against which the other surface acts, one of said wedges having a plain orifice therethrough, the other an orifice provided with a thread therein, a shaft passing through said plain orifice and having a threaded portion working in the thread in the other orifice, projections on the shaft on opposite ends of the plain orifice, and means to limit the movement of the wedges to release.

17. In combination, a plurality of clamping surfaces, extensions from each clamping member, said extensions having orifices, wedges in said orifices, one surface of each wedge supporting the clamp and a fixed impediment for each wedge against which the other surface coacts, one surface of each wedge supporting its corresponding clamping member, a fixed abutment on which the other surface of each wedge rests, one of said wedges having a plain opening therethrough, the other a threaded orifice therein, a shaft passing through the plain orifice wedge and having a threaded portion working in the thread in the orifice of the other wedge, stops on said shaft on opposite ends of the plain orificed wedge, and means to limit the movement of the wedges to release.

In testimony of which invention, I have hereunto set my hand, at Philadelphia, on this 26th day of November, 1910.

LARS H. VOLD.

Witnesses:
WARREN R. CHURCH,
HELEN FAHNESTOCK.

---

Copies of this patent may be obtained for five cents each, by addressing the "Commissioner of Patents, Washington, D. C."